United States Patent
Seo

(10) Patent No.: US 6,568,742 B2
(45) Date of Patent: May 27, 2003

(54) REAR DOOR STRUCTURE OF VEHICLE

(75) Inventor: Kyung-Dug Seo, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/116,088

(22) Filed: Apr. 2, 2002

(65) Prior Publication Data

US 2003/0042754 A1 Mar. 6, 2003

(30) Foreign Application Priority Data

Aug. 30, 2001 (KR) ........................................ 2001-52801

(51) Int. Cl.[7] ................................................. B60J 5/00
(52) U.S. Cl. ..................................... 296/146.6; 296/188
(58) Field of Search ............................ 296/146.6, 188, 296/146.5, 189; 49/502, 503, 501; 52/731.6; 180/274

(56) References Cited

U.S. PATENT DOCUMENTS

| | | | | |
|---|---|---|---|---|
| 3,868,141 A | * | 2/1975 | Johnson | 296/146.6 |
| 4,958,884 A | * | 9/1990 | Gold | 296/146.6 |
| 5,094,034 A | * | 3/1992 | Freeman | 296/146.6 |
| 5,123,694 A | * | 6/1992 | DePierre et al. | 296/188 |
| 5,238,289 A | * | 8/1993 | Pitzer et al. | 296/146.6 |
| 5,277,470 A | * | 1/1994 | Freeman et al. | 296/146.6 |
| 5,370,437 A | * | 12/1994 | Alberda | 296/146.6 |
| 5,544,930 A | * | 8/1996 | Stedman | 296/146.6 |
| 5,580,120 A | * | 12/1996 | Nees et al. | 296/146.6 |
| 5,599,057 A | * | 2/1997 | Hirahara et al. | 296/146.6 |
| 5,800,007 A | * | 9/1998 | Cho | 296/146.6 |
| 5,868,456 A | * | 2/1999 | Kowalski et al. | 296/146.6 |
| 6,033,011 A | * | 3/2000 | Kim | 296/146.6 |
| 6,053,565 A | * | 4/2000 | Cho | 296/146.6 |
| 6,196,619 B1 | * | 3/2001 | Townsend et al. | 296/146.6 |
| 6,332,641 B1 | * | 12/2001 | Okana | 296/146.6 |
| 6,382,707 B1 | * | 5/2002 | Dunneback | 296/146.6 |
| 6,390,534 B1 | * | 5/2002 | Lee et al. | 296/146.6 |
| 2002/0014787 A1 | * | 2/2002 | Yamamoto | 296/146.6 |

FOREIGN PATENT DOCUMENTS

| | | | |
|---|---|---|---|
| EP | 0 492 995 | * | 7/1992 |
| FR | 2 692 848 | * | 12/1993 |
| JP | 58 185317 | * | 10/1983 |
| JP | 63 270223 | * | 11/1988 |
| JP | 5 169974 | * | 7/1993 |
| JP | 5 178092 | * | 7/1993 |
| JP | 6 255365 | * | 9/1994 |

* cited by examiner

Primary Examiner—Kiran Patel
(74) Attorney, Agent, or Firm—Pennie & Edmonds LLP

(57) ABSTRACT

A rear door structure of a vehicle, the structure comprising: a safety beam longitudinally arranged along a vehicle body at a space between a door outer panel and a door inner panel with both ends thereof being supported against the door inner panel via a beam mounting bracket; an extension beam including one end being inserted into and coupled with the safety beam and the other end being overlapped with the door inner panel and surface-coupled with a support jaw portion of the door outer panel and an impact transfer beam formed along a curve surface of a rear wheel housing with one side thereof coupled to the extension beam and the other side thereof coupled to the beam mounting bracket, thereby improving the strength of the safety beam to protect the safety of vehicle occupants when a vehicle is impacted on its side.

8 Claims, 7 Drawing Sheets

REAR DOOR STRUCTURE OF VEHICLE

FIELD OF THE INVENTION

The present invention relates to a rear door structure of a vehicle, and more particularly, to a rear door structure of a vehicle including a safety beam overlapped with a door-side outer panel that can effectively absorb an impact force and protect the safety of occupants.

BACKGROUND OF THE INVENTION

In general, doors are hinged onto a vehicle body to be opened or closed for the vehicle occupant to get in or out of the vehicle. The doors are classified into front and rear doors. A structure of the rear door 10, as shown in FIGS. 1 and 2, includes door outer panel 11 and door inner panel 12 with a predetermined gap with the frames; a door side outer panel 13 bent and formed with predetermined gap with the door inner panel 12; a window glass 15 rising and falling along a door frame 14 by operation of a regulator; and a safety beam 17 installed between the door outer panel 11 and door inner panel 12 along a horizontal axis of the rear door 10 with both ends thereof supported against the door inner panel 12 via a beam mounting bracket 16. Safety beam 17 is typically formed in a shape of cylindrical pipe having a predetermined thickness to protect passengers by reducing the impact force transferred to the rear door 10 when a vehicle is impacted onto its side.

In other words, when a vehicle is crashed into the lateral side of the rear door 10, the impact force thereof is transferred to the safety beam through the door outer panel 11. A part of the safety beam 17, where the crash impact is applied, reduces the impact force by being transformed and destructed toward the door inner panel 12. As a result, the impact is reduced by transformation and destruction of the safety beam 17 to prevent any severe injury.

However, one problem in the conventional structure of the rear door thus constructed in that both ends of the safety beam 17 are installed without overlapping a support jaw portion 13-1 of the door side outer panel 13 due to limitations in its size and shape. The safety beam is mounted only with a simple connection to the door inner panel 12 via a beam mounting bracket 16, so that the safety beam 17 can not effectively absorb a side impact force.

On the other hand, the safety beam 27 of the front door 20, as shown in FIG. 3, is installed with both ends thereof longitudinally, extensively overlapping a support jaw portion 23-1 of door side outer panel 23 and connected to a door inner panel 22 by a beam mounting bracket 26. The beam mounting bracket 26 simply connects the safety beam 27 to the door inner panel 22, not to directly absorb the impact force like the beam mounting bracket 16 of the rear door 10 described above.

However, when a side impact occurs, the safety beam 27 of the front door 20 thus constructed protects occupants by effectively absorbing or scattering most of the crash impact. This is because the safety beam 27 of the front door 20 has a structure with both ends thereof being longitudinally, extensively overlapping with the support jaw portion 23-1 of the door side outer panel 23.

The impact absorbing capability of the safety beam may be determined based not only on thickness or strength, but also the size of overlap with the support jaw portion of the door side outer panel, as shown in FIG. 3. Both ends of the safety beam 27 of the front door 20 are installed in the structure forming an overlap (C) with the support jaw portion 23-1 of the door side outer panel 23. On the other hand, both ends of the safety beam 17 of the rear door 10 are not overlapped with the support jaw portion 13-1 of the door side outer panel 13 adjacent the rear wheel housing (not shown) in the structure as shown in FIG. 2. Thus, the conventional safety beam 17 of the rear door 10 can not as effectively absorb or scatter the impact force.

SUMMARY OF THE INVENTION

The present invention provides a rear door structure of a vehicle that improves the impact absorbing or scattering capability of the safety beam, and protects the safety of vehicle occupants when the vehicle experiences side impact.

In a preferred embodiment of the present invention, there is provided a rear door structure of a vehicle comprising a safety beam, an extension beam and an impact transfer beam. The safety beam is longitudinally arranged along a vehicle body at a space between a door outer panel and a door inner panel with both ends thereof being supported against the door inner panel via a beam mounting bracket. The extension beam includes one end inserted into and coupled with the safety beam and the other end overlapped with the door inner panel and surface-coupled with a support jaw portion of the door outer panel at a predetermined length. The impact transfer beam is formed along a curved surface of a rear wheel housing with one side thereof coupled to the extension beam and the other side thereof coupled to the beam mounting bracket.

In an alternative embodiment of the invention, there is provided a rear door structure for a vehicle comprising inner and outer door panels which define a gap therebetween, and the inner panel defines a stepped portion. A safety beam is positioned horizontally within the door, and terminates short of the inner panel stepped portion. An extension beam extends from the safety beam and overlaps the inner panel stepped portion. A mounting bracket is interposed between the extension beam and inner door panel stepped portion, securing together the extension beam, safety beam and inner door panel. An impact transfer beam is mounted substantially vertically between the extension beam and inner door panel stepped portion, and is curved to at least substantially follow a contour of an associated rear wheel housing.

In a further preferred embodiment, the safety beam is a tubular member wherein an extension beam is inserted into an end of the tubular member. The mounting bracket overlaps the end of the tubular member and is angled inward to contact the extension beam adjacent an end of the extension beam opposite the tubular member.

BRIEF DESCRIPTION OF THE DRAWINGS

Objects and aspects of the invention will become apparent from the following description of preferred embodiments with reference to the accompanying drawings in which.

DETAILED DESCRIPTION OF THE INVENTION

Figure 1:
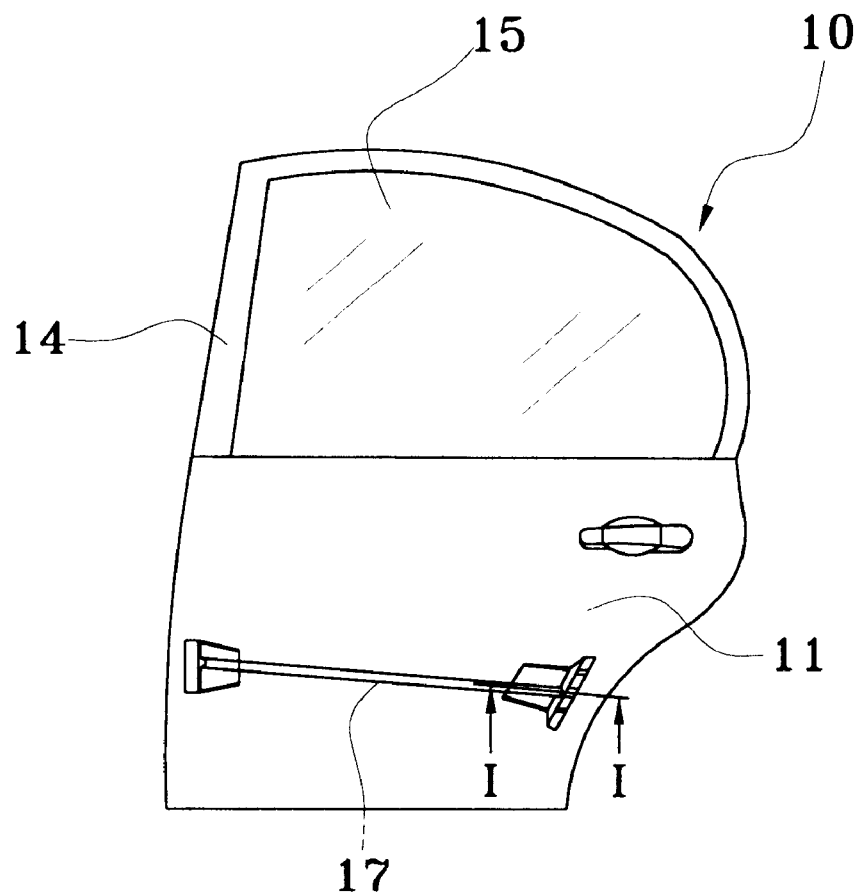
FIG. 1 is a front view illustrating a general rear door of a vehicle.
Figure 2:
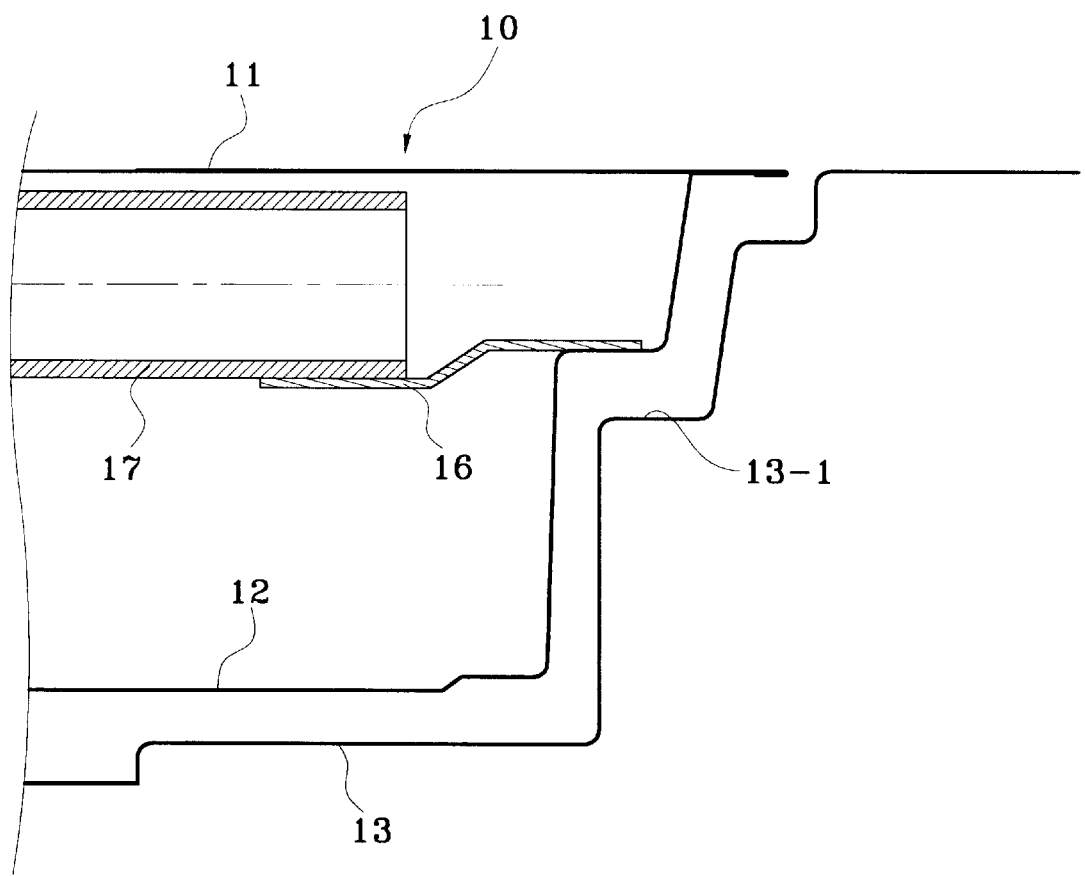
FIG. 2 is a partial, cross-sectional view along line I—I shown in FIG. 1.
Figure 3:
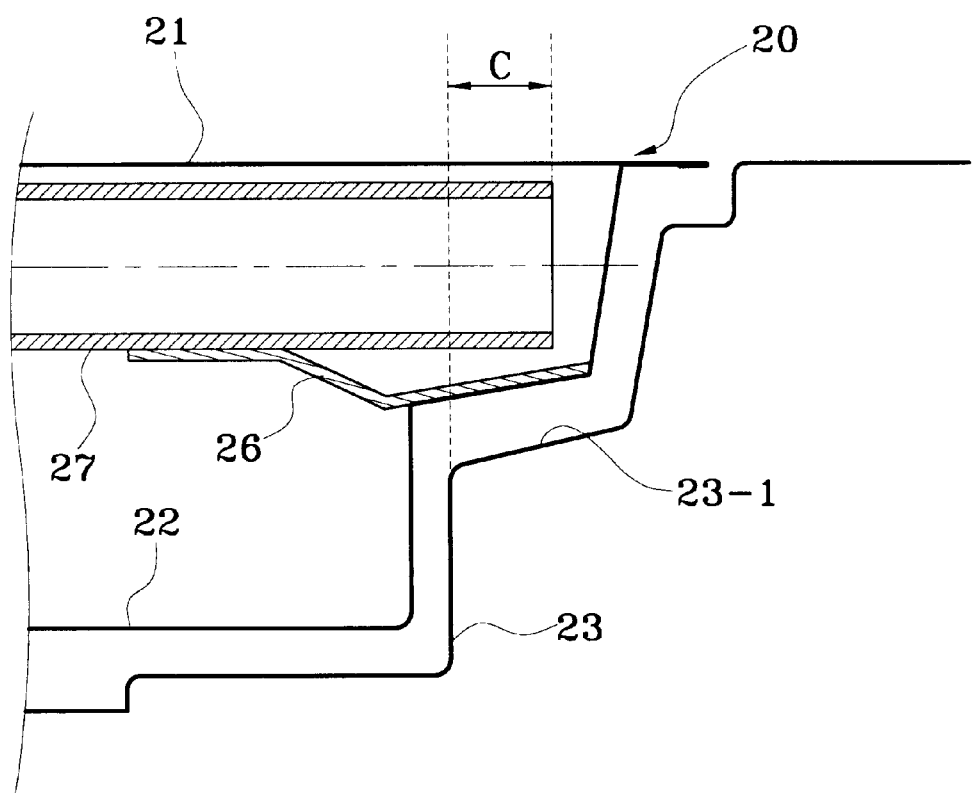
FIG. 3 is a vertical, cross-sectional view illustrating a front door safety beam structure.

Hereinafter, a preferred embodiment of the present invention will be described in detail with reference to accompanying drawings. Identical reference numerals will be used for indicating the same parts as those in the prior art.

Figure 4:
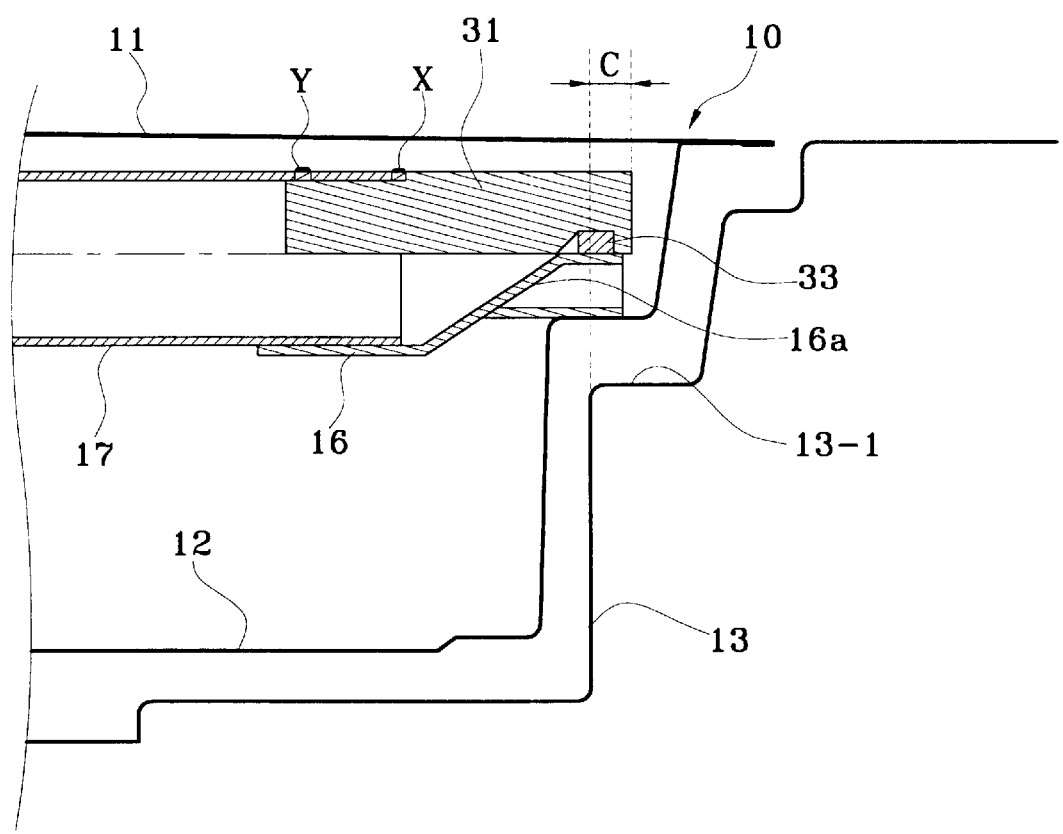
FIG. 4 is a vertical, cross-sectional view illustrating a rear door structure in accordance with the present invention.
Figure 5:
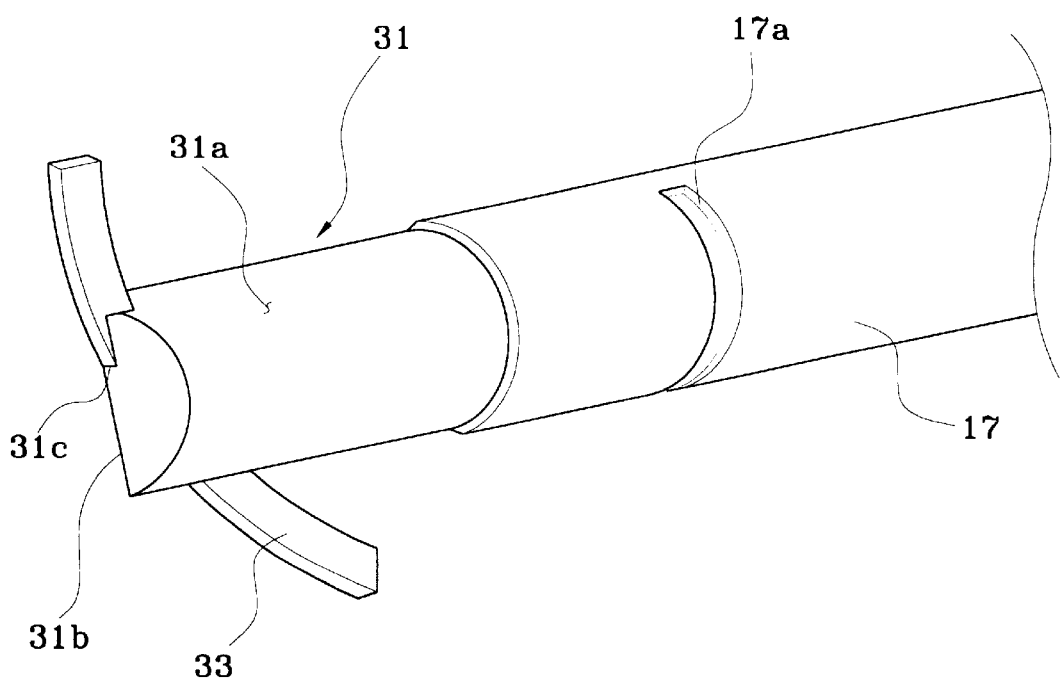
FIGS. 5 through 7 are, respectively, a perspective view, a vertical cross-sectional view and front view illustrating coupling an extension beam and an impact transfer beam at both ends of the safety beam in accordance with the present invention.
Figure 6:
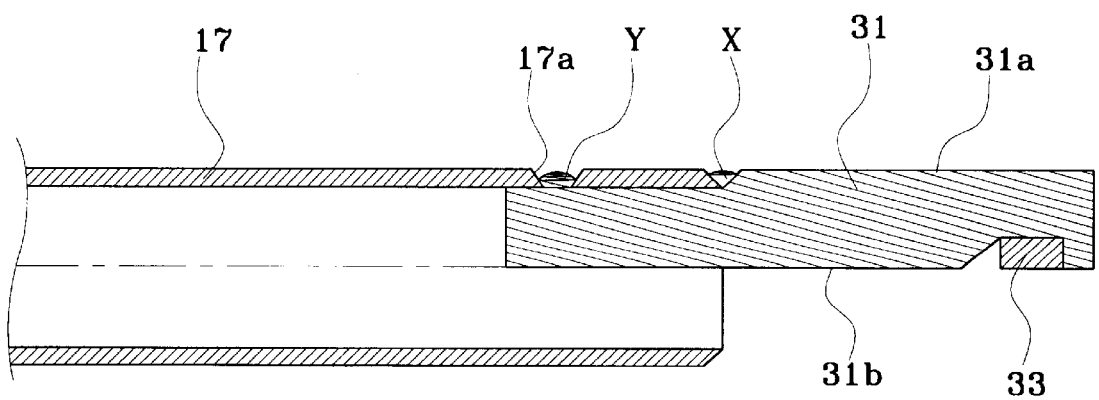
Figure 7:
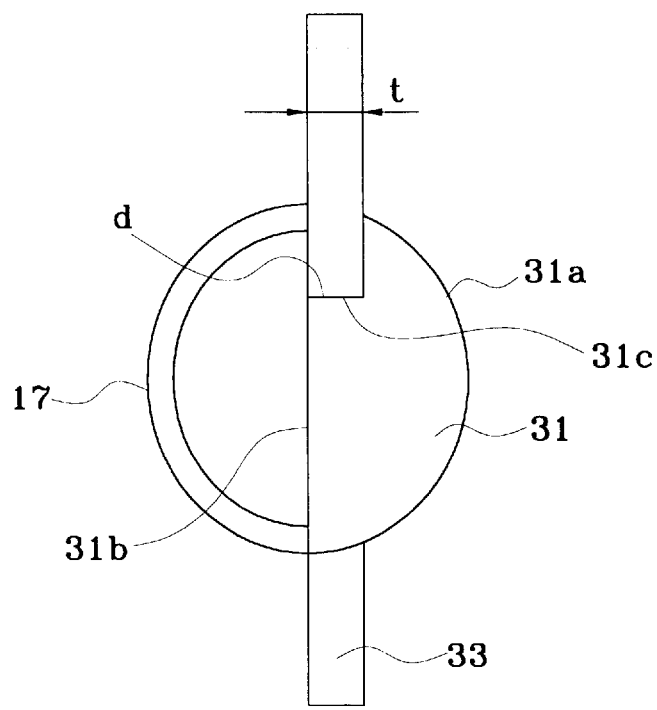
Figure 8:
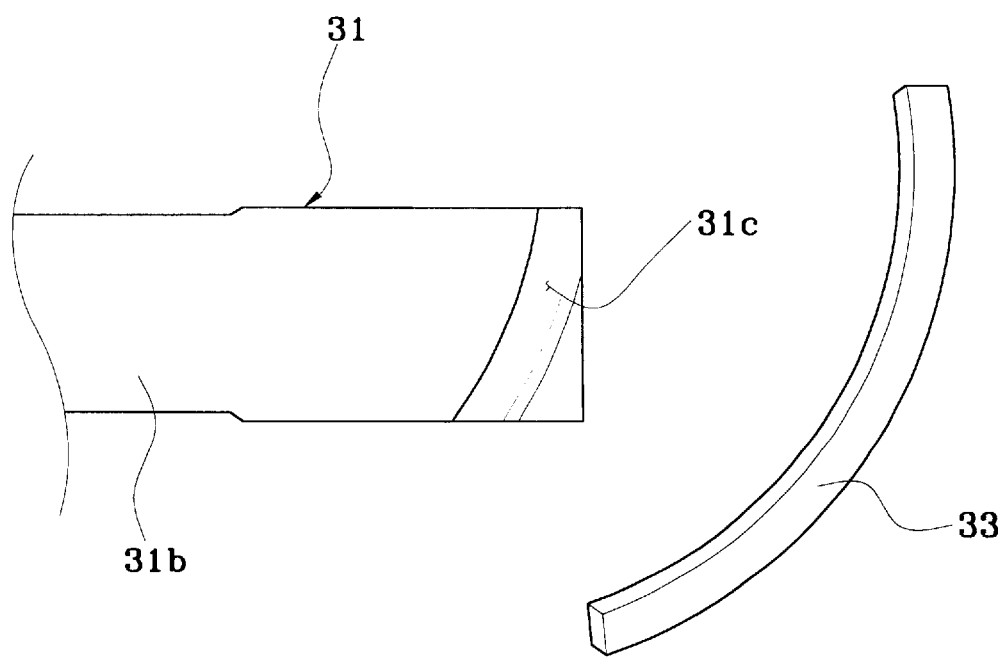
FIG. 8 is an exploded, perspective view illustrating the process of coupling extension beam and impact transfer beam in accordance with the present invention.
Figure 9:
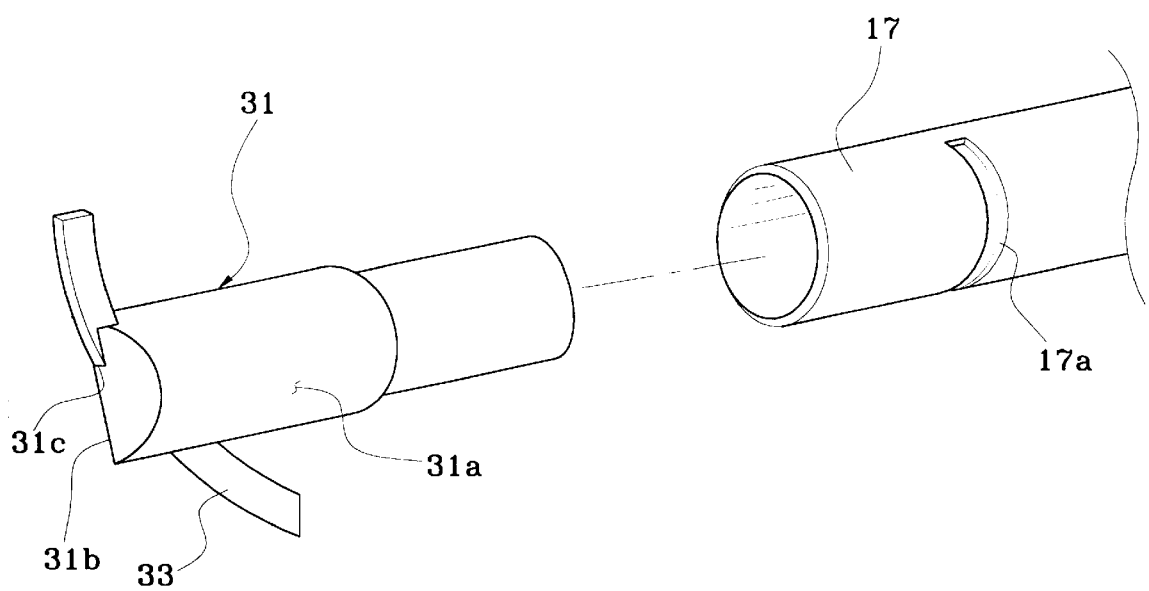
FIG. 9 is an exploded, perspective view illustrating the process of coupling extension beam and safety beam in accordance with the present invention.

In the present invention, the rear door 10 of a vehicle, as shown in FIGS. 4 through 9, preferably includes an extension beam with one end inserted and coupled to the safety beam 17 and the other end overlapped with the door inner panel 12 and surface-coupled to a support jaw portion 13-1 of the door outer panel 13 at a predetermined overlap distance (C). An impact transfer beam 33 is formed along a curved surface of the rear wheel housing, with one side thereof coupled to the extension beam 31 and the other side thereof coupled with the beam mounting bracket 16. A flange 16a is integrally bent toward the extension beam 31 and the extension beam 31 and impact transfer beam 33 are surface-fastened at one side of the flange 16a.

A groove of a predetermined size is formed at an external circumference in both ends of the safety beam 17 for an inward connection. The extension beam 31, inserted into the safety beam 17, is welded to the safety beam at portion X, where the extension beam 31 is contacted with the end of the safety beam 17, and at portion Y, where the extension beam 31 is connected with the groove 17a.

Extension beam 31 is preferably formed with a semicircular cross-section. A curved part 31a thereof is coupled to the safety beam 17 and a flat part 31b thereof is respectively coupled to the impact transfer beam 33 and beam mounting bracket 16. In addition, the flat part 31b of the extension beam 31 has a groove 31c for insertion of one side of the beam mounting bracket 16. The depth (d) of the groove 31c is formed identical to the thickness (t) of the beam mounting bracket 16.

One end of the extension beam 31 is inserted into both ends of the safety beam 17 and then welded and fastened together. The impact transfer beam 33 is welded and fastened with the flat side 31b of the extension beam 31. The extension beam 31 and impact transfer beam 33 are welded with the flange 16a of the beam mounting bracket 16 that connects the safety beam 17 and the door inner panel 12. A predetermined portion of one end of the extension beam 31 and the impact transfer beam 33 are overlapped with a predetermined part of the door inner panel 12. As a result, the extension beam 31 and impact transfer beam 33 overlaps the support jaw portion 13-1 of the door outer panel 13 over a predetermined distance (C).

Therefore, the installation strength (support strength) of the safety beam 17 is improved and the impact absorbing or impact dispersing capability of the safety beam 17 is greater, such that when a vehicle is impacted on its side, safety of the vehicle occupants is improved.

What is claimed is:

1. A rear door structure of a vehicle, the structure comprising:

a safety beam longitudinally arranged along a vehicle body at a space between a door outer panel and a door inner panel with both ends thereof being supported against the door inner panel via a beam mounting bracket;

an extension beam including one end being inserted into and coupled with the safety beam and the other end being overlapped with the door inner panel and surface-coupled with a support jaw portion of the door outer panel; and an impact transfer beam formed along a curved surface of a rear wheel housing with one side thereof coupled to the extension beam and the other side thereof coupled to the beam mounting bracket.

2. The rear door structure, as defined in claim 1, wherein a flange is integrally bent toward the extension beam and the extension beam and impact transfer beam are surface-fastened at one side of the flange.

3. The rear door structure, as defined in claim 1, wherein a cut groove is formed at an external circumference in both ends of the safety beam for an inward connection and the extension beam inserted into the safety beam are welded together where the extension beam is inserted in the end of the safety beam and where the extension beam is connected with the cut groove.

4. The rear door structure, as defined in claim 1, wherein the extension beam is formed with a semicircular cross-section and a curved part thereof is coupled to the safety beam and a flat part thereof is coupled to the impact transfer beam and beam mounting bracket.

5. The rear door structure, as defined in claim 4, wherein the flat part of the extension beam has a groove for insertion of one side of the beam mounting bracket, and the depth of the groove is formed identical to the thickness of the beam mounting bracket.

6. A rear door structure for a vehicle, comprising:

inner and outer door panels defining a gap therebetween, the inner panel defining a stepped portion;

a safety beam positioned horizontally within said door, said safety beam terminating short of said inner panel stepped portion;

an extension beam extending from the safety beam and overlapping said inner panel stepped portion;

a mounting bracket interposed between the extension beam and inner door panel stepped portion, said mounting bracket securing together the extension beam, safety beam and inner door panel; and an impact transfer beam mounted substantially vertically between said extension beam and inner door panel stepped portion.

7. The rear door structure according to claim 6, wherein said impact transfer beam is curved to at least substantially follow a contour of an associated rear wheel housing.

8. The rear door structure according to claim 6, wherein:

said safety beam is a tubular member;

said extension beam is inserted into an end of the tubular member;

said mounting bracket overlaps the end of the tubular member and is angled inward to contact the extension beam adjacent an end of the extension beam opposite the tubular member.

* * * * *